United States Patent [19]

Ohira

[11] Patent Number: 4,905,103
[45] Date of Patent: Feb. 27, 1990

[54] MAGNETIC RECORDING APPARATUS
[75] Inventor: Tsunehisa Ohira, Sagamihara, Japan
[73] Assignee: Victor Company of Japan, Ltd., Yokohama, Japan
[21] Appl. No.: 183,535
[22] Filed: Apr. 14, 1988
[30] Foreign Application Priority Data Apr. 20, 1987 [JP] Japan .................. 62-97181

[51] Int. Cl.$^4$ .......................... G11B 15/14
[52] U.S. Cl. ............................. 360/64
[58] Field of Search ............ 360/20, 21, 64, 33

[56] References Cited

U.S. PATENT DOCUMENTS 4,591,924  5/1986  Miura et al.

FOREIGN PATENT DOCUMENTS 0110375  6/1984  European Pat. Off.
0136808  4/1985  European Pat. Off.
3208122  9/1983  Fed. Rep. of Germany
3341644  5/1984  Fed. Rep. of Germany
2132403  7/1984  United Kingdom Primary Examiner—Vincent P. Canney
Attorney, Agent, or Firm—Lowe, Price, LeBlanc, Becker & Shur

[57] ABSTRACT

A magnetic recording apparatus includes a rotary drum around which a magnetic tape extends in an angular range substantially equal to 270°. Four pairs of magnetic rotary heads are mounted on the rotary drum. The rotary heads in each of the pairs have a common azimuth angle. Two of the pairs of the rotary heads are angularly spaced substantially at right angles and have track widths greater than a track pitch in a long-play mode and constitute video heads used in both of the long-play mode and a normal-play mode. Other two of the pairs of the rotary heads are angularly spaced substantially at right angles and constitute audio heads. The video heads alternate with the audio heads in a direction of rotation of the rotary drum. During a recording mode where guard bands are provided between video signal recording tracks formed via the video heads, a group of audio signal recording tracks and a group of video signal recording tracks are formed in a deep portion and an outermost portion of a magnetic layer of the magnetic tape respectively. In order to prevent crosstalk between an audio signal and a video signal during a reproduction process, a recorded audio signal is erased from an outermost portion of the tape magnetic layer in an unnecessary region.

4 Claims, 8 Drawing Sheets

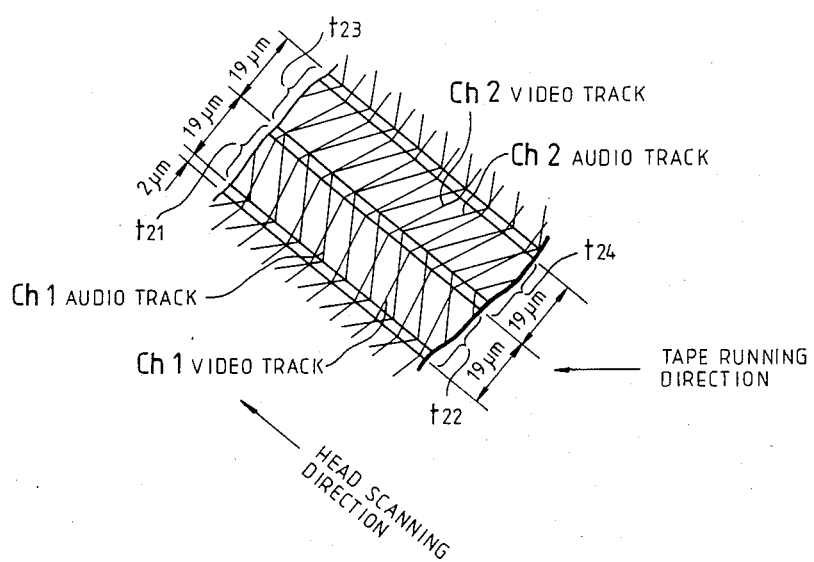
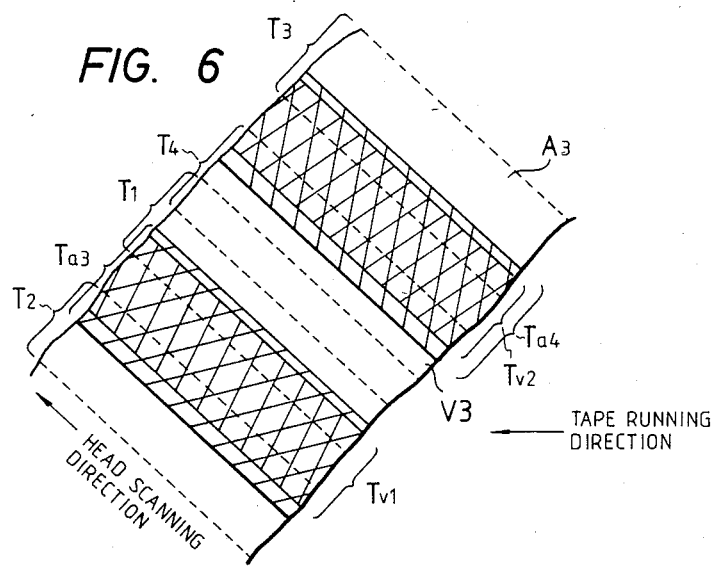

MAGNETIC RECORDING APPARATUS

BACKGROUND OF THE INVENTION

This invention relates to a magnetic recording apparatus such as a video tape recorder Some video tape recorders of the helical scan type have a rotary drum around which a magnetic tape obliquely extends in an angular range of about 270°. A video signal is recorded in the magnetic tape via rotary magnetic heads carried on the rotary drum and spaced at equal angular intervals of 90°. An audio signal is conventionally recorded in the magnetic tape via a fixed magnetic head.

In advanced video tape recorders, an audio signal is recorded in a magnetic tape via rotary magnetic heads to improve the quality of a corresponding reproduced audio signal.

Generally, it is important to prevent crosstalk between an audio signal and a video signal during a reproduction process. In addition, a high quality of a reproduced audio signal is desirable.

SUMMARY OF THE INVENTION

It is an object of this invention to provide a magnetic recording apparatus which can prevent crosstalk between an audio signal and a video signal during a reproduction process.

It is another object of this invention to provide a magnetic recording apparatus which allows a high quality of a reproduced audio signal A magnetic recording apparatus of this invention includes a rotary drum around which a magnetic tape extends in an angular range substantially equal to 270°. Four pairs of magnetic rotary heads are mounted on the rotary drum. The rotary heads in each of the pairs have a common azimuth angle. Two of the pairs of the rotary heads are angularly spaced substantially at right angles and have track widths greater than a track pitch in a long-play mode and constitute video heads used in both of the long-play mode and a normal-play mode. The other two of the pairs of the rotary heads are angularly spaced substantially at right angles and constitute audio heads. The video heads alternate with the audio heads in a direction of rotation of the rotary drum. During a recording mode where guard bands are provided between video signal recording tracks formed via the video heads, a group of audio signal recording tracks and a group of video signal recording tracks are formed in a deep portion and an outermost portion of a magnetic layer of the magnetic tape respectively by repeating processes as follows: one of the audio heads forms an audio signal recording track in the magnetic tape and then the subsequent audio head and video head erase a previously-recorded signal from an outermost portion of the tape magnetic layer in the audio signal recording track; and one of the video heads forms a video signal recording track in an outermost portion of the tape magnetic layer in an area substantially equal to a location of the audio signal recording track where the recorded signal was erased from the outermost portion of the tape magnetic layer.

BRIEF DESCRIPTION OF THE DRAWINGS

FIG. 4 is a diagram of a track pattern formed by the magnetic recording apparatus of the first embodiment during long-play mode operation.

FIG. 6 is a diagram of a track pattern formed by the magnetic recording apparatus of the first embodiment during normal-play mode operation.

DESCRIPTION OF THE FIRST PREFERRED EMBODIMENT

Figure 1:
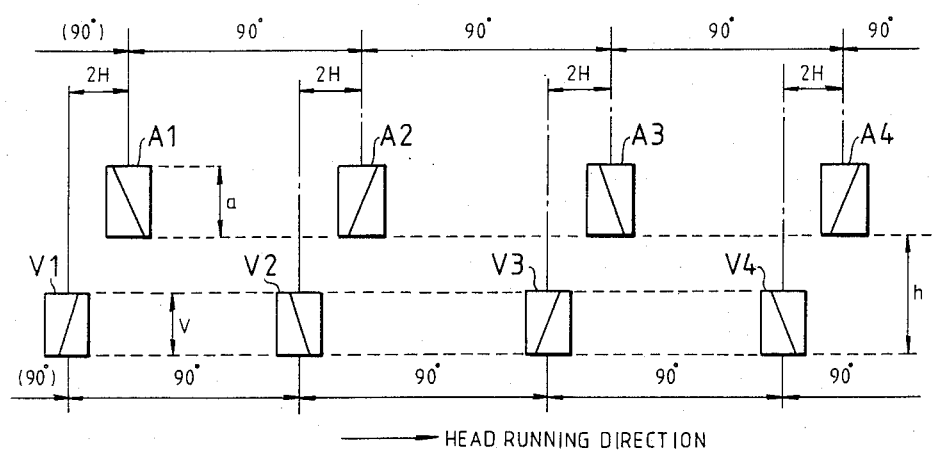
FIG. 1 is a developed side view of a rotary drum with magnetic heads in a magnetic recording apparatus according to a first embodiment of this invention.
Figure 2:
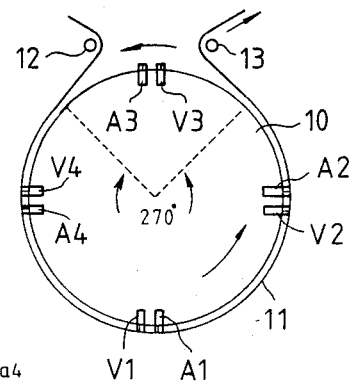
FIG. 2 is a top view of the rotary drum and the magnetic heads of FIG. 1.

With reference to FIGS. 1 and 2, a magnetic recording apparatus includes video heads V1, V2, V3, and V4 mounted on the circumferential surface of a rotary drum 10 and spaced at equal angular intervals of 90°. Audio heads A1, A2, A3, and A4 are mounted on the circumferential surface of the rotary drum 10 and spaced at equal angular intervals of 90°. As shown in FIG. 2, tape guides 12 and 13 allow the magnetic tape 11 to move around the rotary drum 10.

The video heads V1-V4 are in a common height along the axis of the rotary drum 10. The audio heads A1-A4 are also in a common height which is higher than the position of the video heads V1-V4 by a distance "h". The video heads V1, V2, V3, and V4 are close to the audio heads A1, A2, A3, and A4 respectively The interval between the adjacent heads V1 and A1 in the direction of rotation of the rotary drum 10 corresponds to twice a horizontal scanning period (2H) of the video signal The audio head A1 is in advance of the video head V1 in the direction of rotation of the rotary drum 10. The adjacent heads V1 and A1 form a pair of double azimuth heads Similarly, the adjacent heads V2 and A2, the adjacent heads V3 and A3, and the adjacent heads V4 and A4 form respective pairs of double azimuth heads. Each pair of the adjacent heads occupy a space equal to a space which a single rotary head occupies in a conventional video tape recorder.

Each pair of the heads opposed diametrically with respect to the rotary drum 10 have a common azimuth angle. For example, the azimuth angles of the video heads V1 and V3 are +6°. The azimuth angles of the video heads V2 and V4 are −6°. The azimuth angles of the audio heads A1 and A3 are −30°. The azimuth angles of the audio heads A2 and A4 are +30°.

The track widths "v" of the respective video heads V1-V4 are chosen so as to ensure an acceptable picture quality during operation of the magnetic recording apparatus in a normal-play (normal-time) mode. In addition, the track widths "v" are set slightly greater than the pitch between video signal recording tracks (video tracks) during operation of the magnetic recording apparatus in a long-play (long-time) mode. The height difference "h" between the position of the video heads V1-V4 and the position of the audio heads A1-A4 is set close to an integral multiple of one third of the pitch between video tracks in the normal-play mode. In addition, the height difference "h" is set to a value close to an integral multiple of one third of the pitch between video tracks in the long-play mode.

The factor of ⅓ results from the following facts. As shown in FIG. 2, a magnetic tape 11 obliquely extends around the rotary drum 10 in an angular range which is slightly greater than 270° and specifically which equals the sum of 270° and an angle corresponding to an overlap recording interval. Since the rotary drum 10 is rotated at a speed such that a rotational angle of 270° corresponds to one field of the video signal, the intervals between the pairs of the double azimuth heads correspond to one third of a field period. Accordingly, the positions where the audio heads A1-A4 perform recording actions are in advance of the positions where the video heads V1-V4 perform recording actions by a period which equals an integer times one third of a field period.

The track widths "a" of the audio heads A1-A4 are chosen so that video signal recording tracks (video tracks) and audio signal recording tracks (audio tracks) essentially overlap each other In one example where the pitch between video tracks is equal to 58 micrometers in the normal-play mode and is equal to 19 micrometers in the long-play mode, the track widths "v" of the video heads V1-V4 are set to 26 micrometers, and the track widths "a" of the audio heads A1-A4 are set to 32 micrometers and the height difference "h" between the position of the video heads and the position of the audio heads is set to 34 micrometers. During the normal-play mode, the formation of audio signal recording tracks is performed in advance of the formation of video signal recording tracks by a period which equals two times one third of a field period. During the long-play mode, the formation of audio signal recording tracks is performed in advance of the formation of video signal recording tracks by a period which equals five times one third of a field period.

Figure 3:
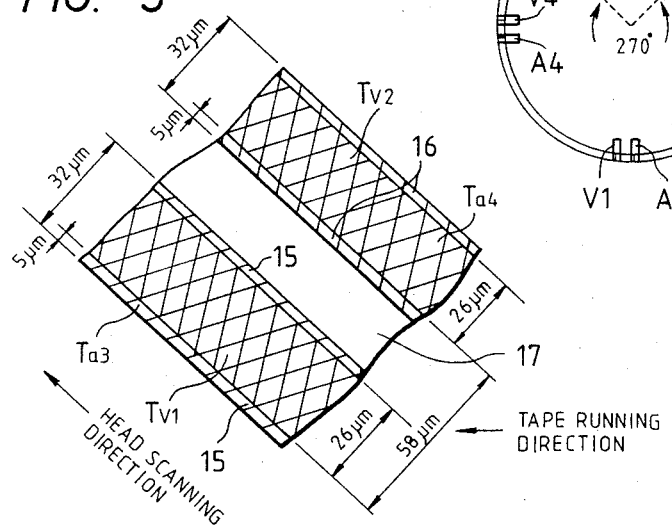
FIG. 3 is a diagram of a track pattern formed by the magnetic recording apparatus of the first embodiment during normal-play mode operation.

FIG. 3 shows a track pattern formed in the normal-play mode. As shown in FIG. 3, after an audio track Ta3 having a width of 32 micrometers is formed by the audio head A3, a video track Tv1 having a width of 26 micrometers is formed by the video head V1. During a subsequent stage, after an audio track Ta4 having a width of 32 micrometers is formed by the audio head A4, a video track Tv2 having a width of 26 micrometers is formed by the video head V2.

The audio tracks Ta3 and Ta4 are greater in width than the video tracks Tv1 and Tv2. A guard band 17 is formed between the audio tracks Ta3 and Ta4, and between the video tracks Tv1 and Tv2. There are portions 15 and 16 of the audio tracks Ta3 and Ta4 which extend outside the related video tracks Tv1 and Tv2, that is, which are not overwritten with the related video tracks Tv1 and Tv2.

FIG. 4 shows a track pattern in the long-play mode. As shown in FIG. 4, there is no guard band between audio tracks t21 and t23, and between video tracks t22 and t24. The pitch between tracks is equal to 19 micrometers. Accordingly, outermost portions of a tape magnetic layer in the audio tracks t21 and t23 are always formed with the video tracks t22 and t23, and the entire areas of the audio tracks are overwritten with the video tracks. It should be noted that, portions of the audio tracks which are not overwritten with the video tracks tend to cause crosstalk of an audio signal into a reproduced video signal.

Figure 5:
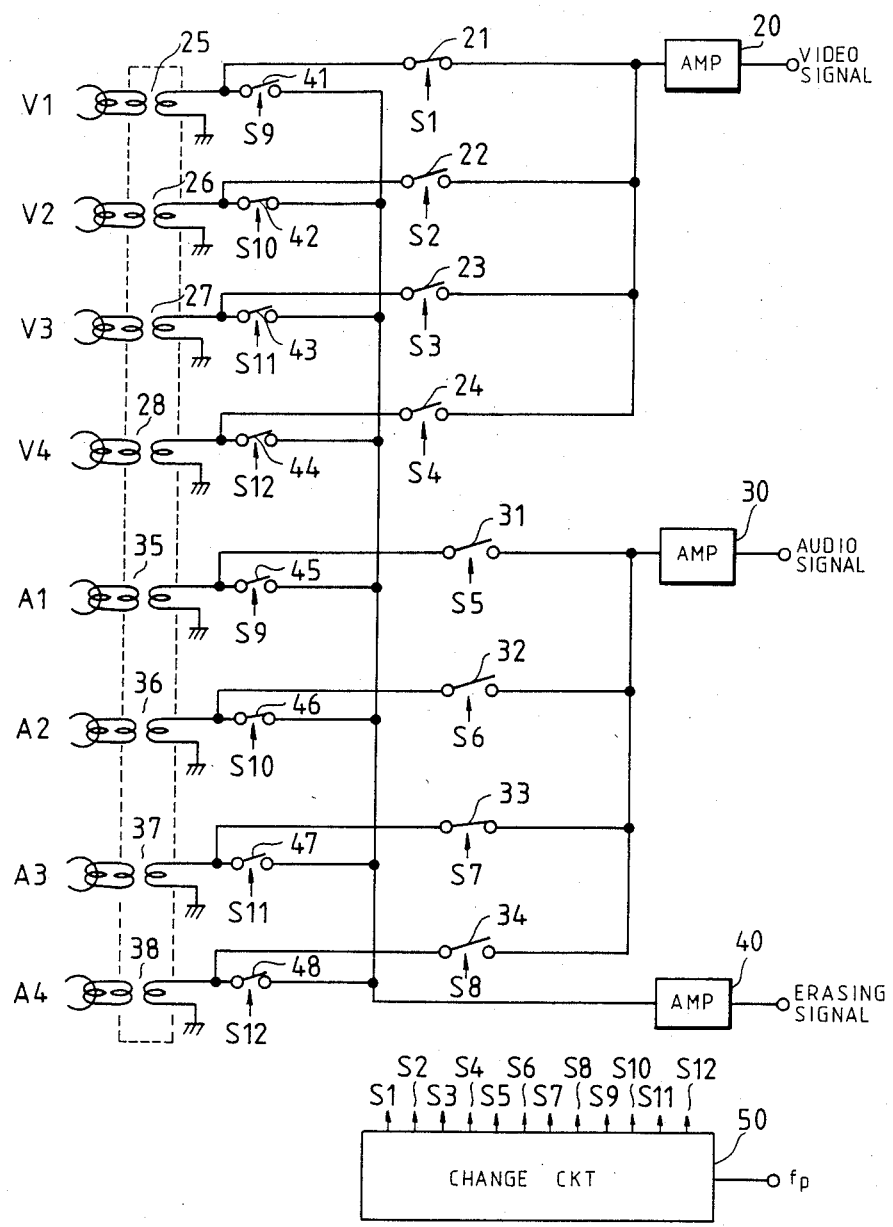
FIG. 5 is a diagram of an electric portion of the magnetic recording apparatus of the first embodiment.

As shown in FIG. 5, a video signal is applied to an input terminal of an amplifier 20. An output terminal of the amplifier 20 is connected to the video heads V1, V2, V3, and V4 via switches 21, 22, 23, and 24, and via rotary transformers 25, 26, 27, and 28 respectively. When either of the switches 21-24 is closed, the video signal is transmitted from the amplifier 20 to the video head associated with the closed switch. Control terminals of the switches 21, 22, 23, and 24 are subjected to control signals S1, S2, S3, and S4 respectively which are output from a change circuit 50. The switches 21-24 are closed and opened in accordance with the respective control signals S1-S4.

An audio signal is applied to an input terminal of an amplifier 30. An output terminal of the amplifier 30 is connected to the audio heads A1, A2, A3, and A4 via switches 31, 32, 33, and 34, and via rotary transformers 35, 36, 37, and 38 respectively. When either of the switches 31-34 is closed, the audio signal is transmitted from the amplifier 30 to the audio head associated with the closed switch. Control terminals of the switches 31, 32, 33, and 34 are subjected to control signals S5, S6, S7, and S8 respectively which are output from the change circuit 50 The switches 31-34 are closed and opened in accordance with the respective control signals S5-S8.

An erasing signal is applied to an input terminal of an amplifier 40. An output terminal of the amplifier 40 is connected to the heads V1, V2, V3, V4, A1, A2, A3, and A4 via switches 41, 42, 43, 44, 45, 46, 47, and 48, and via the rotary transformers 25, 26, 27, 28, 35, 36, 37, and 38 respectively. When some of the switches 41-48 are closed, the erasing signal is transmitted from the amplifier 40 to the heads associated with the closed switches Control terminals of the switches 41, 42, 43, and 44 are subjected to control signals S9, S10, S11, and S12 respectively which are output from the change circuit 50. The switches 41-44 are closed and opened in accordance with the respective control signals S9-S12. Control terminals of the switches 45, 46, 47, and 48 are subjected to the control signals S9, S10, S11, and S12 respectively. The switches 45-48 are closed and opened in accordance with the respective control signals S9-S12. Since the switches 41 and 45 are controlled by the common signal S9, the application and removal of the erasing signal to and from the video head V1 is performed simultaneously with the application and removal of the erasing signal to and from the audio head A1. Since the switches 42 and 46 are controlled by the common signal S10, the application and removal of the erasing signal to and from the video head V2 is performed simultaneously with the application and removal of the erasing signal to and from the audio head A2. Since the switches 43 and 47 are controlled by the common signal S11, the application and removal of the erasing signal to and from the video head V3 is performed simultaneously with the application and removal of the erasing signal to and from the audio head A3. Since the switches 44 and 48 are controlled by the common signal S12, the application and removal of the erasing signal to and from the video head V4 is performed simultaneously with the application and removal of the erasing signal to and from the audio head A4.

Figure 7:
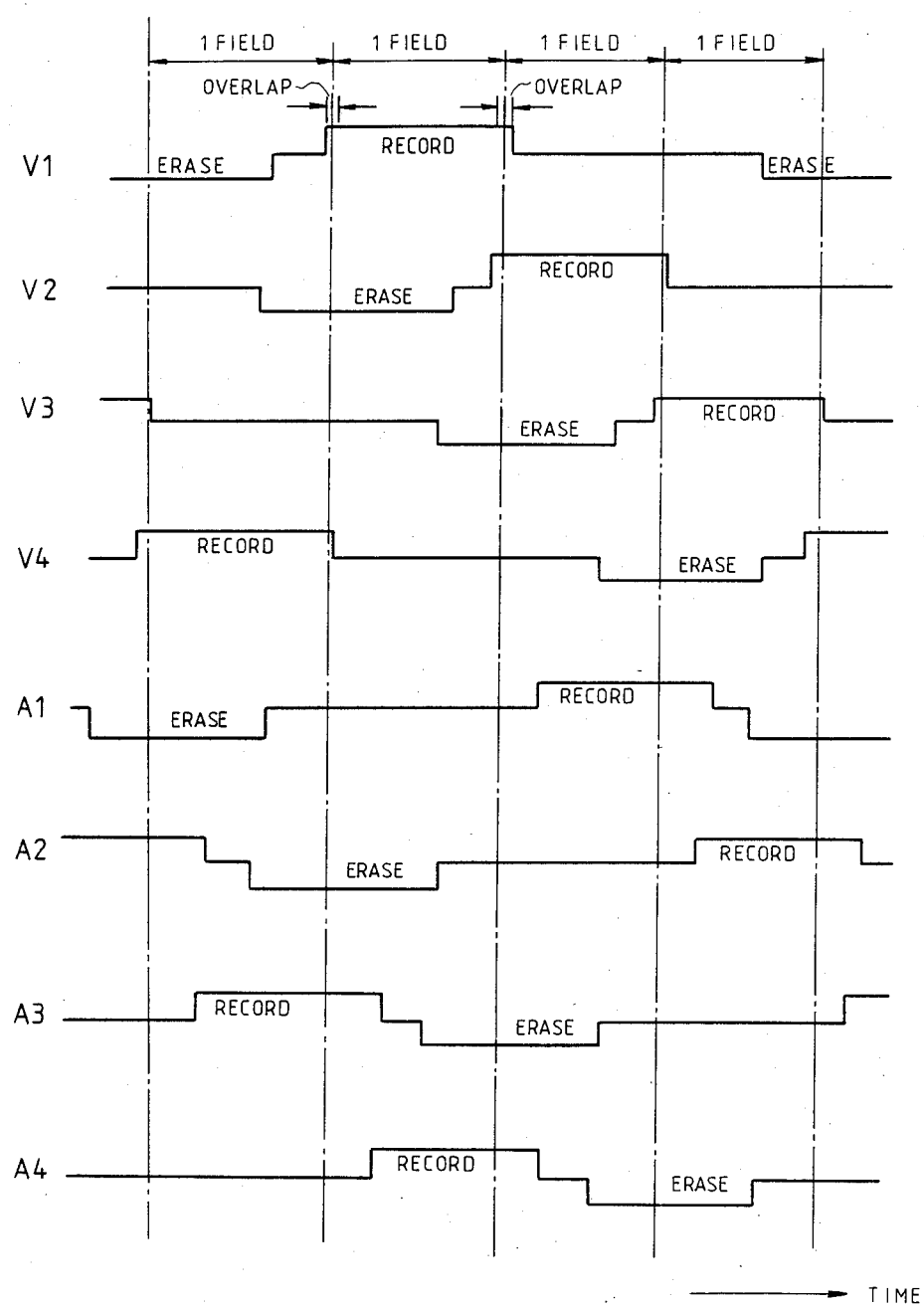
FIG. 7 is a timing diagram of operations of the magnetic heads of FIGS. 1 and 2.

Operation of the magnetic recording apparatus in the normal-play mode will be described hereinafter with reference to FIGS. 5-7. When the switch 33 is closed by the control signal S7, the audio signal is applied to the audio head A3 so that the audio signal is recorded in the magnetic tape along an audio track Ta3 (see FIG. 6) formed by the audio head A3. In this audio track Ta3, the audio signal is recorded even in a deep portion of the tape magnetic layer. The recording of the audio signal via the audio head A3 continues for a period approximately corresponding to one field. As shown in FIG. 7, during the recording of the audio signal via the audio head A3, the switches 23 and 43 remain opened by the control signals S3 and S11 so that no signal is applied to the video head V3 and thus the video head V3 remains deactivated. When a period corresponding to one third of a field elapses since the initiation of the recording related to the audio track Ta3, the switches 46 and 42 are closed by the control signal S10 so that the erasing signal is applied to the audio head A2 and the video head V2 and thus the erasing signal is recorded in the magnetic tape along tracks T1 and T2 (see FIG. 6) formed by the heads A2 and V2. The erasing signal erases the audio signal recorded in an outermost portion of the tape magnetic layer The erasing signal is composed of a high frequency signal in order to be prevented from interfering with a video signal during a reproduction process. The erasing process via the video head V2 and the audio head A2 continues for a period approximately corresponding to one field.

When a period corresponding to one third of a field elapses since the initiation of the erasing process by the video head V2 and the audio head A2, the switch 21 is closed by the control signal S1 so that the video signal is applied to the video head V1 and thus the video signal is recorded in the magnetic tape along a video track Tv1 (see FIG. 6) formed by the video head V1. In this case, the video signal is recorded in an outermost portion of the tape magnetic layer in the audio track Ta3. The recording of the video signal via the video head V1 continues for a period approximately corresponding to one field. During the recording of the video signal via the video head V1, the audio head A1 remains deactivated by the control signals S5 and S9.

When a period corresponding to one third of a field elapses since the initiation of the recording process by the video head V1, the switch 34 is closed by the control signal S8 so that the audio signal is applied to the audio head A4 and thus the audio signal is recorded in the magnetic tape along an audio track Ta4 (see FIG. 6) formed by the audio head A4. In this audio track Ta4, the audio signal is recorded even in a deep portion of the tape magnetic layer. The recording of the audio signal via the audio head A4 continues for a period approximately corresponding to one field. As shown in FIG. 7, during the recording of the audio signal via the audio head A4, the switches 24 and 44 remain opened by the control signals S4 and S12 so that no signal is applied to the video head V4 and thus the video head V4 remains deactivated. When a period corresponding to one third of a field elapses since the initiation of the recording related to the audio track Ta4, the switches 47 and 43 are closed by the control signal S11 so that the erasing signal is applied to the audio head A3 and the video head V3 and thus the erasing signal is recorded in the magnetic tape along tracks T3 and T4 (see FIG. 6) formed by the heads A3 and V3. The erasing signal erases the audio signal recorded in an outermost portion of the tape magnetic layer. The erasing process via the video head V3 and the audio head A3 continues for a period approximately corresponding to one field.

When a period corresponding to one third of a field elapses since the initiation of the erasing process by the video head V3 and the audio head A3, the switch 22 is closed by the control signal S2 so that the video signal is applied to the video head V2 and thus the video signal is recorded in the magnetic tape along a video track Tv2 (see FIG. 6) formed by the video head V2. In this case, the video signal is recorded in an outermost portion of the tape magnetic layer in the audio track Ta4. The recording of the video signal via the video head V2 continues for a period approximately corresponding to one field. During the recording of the video signal via the video head V2, the audio head A2 remains deactivated by the control signals S6 and S10.

A first half of one cycle of the overall operation of the magnetic recording apparatus in the normal-play mode is performed as described previously. A second half of one cycle is similar to the first half thereof. Specifically, during the second half of one cycle of the overall operation of the magnetic recording apparatus, each time a period corresponding to one third of a field elapses, the following processes are sequentially performed: the formation of an audio track via the audio head A1; the erasing process via the heads A4 and V4; the formation of a video track via the video head V3; the formation of an audio track via the audio head A2; the erasing process via the heads A1 and V1; and the formation of a video track via the video head V4. The formation of the video track via the video head V4 is followed by the formation of an audio track via the audio head A3 in a first half of another cycle. As shown in FIGS. 3 and 6, a track pattern formed during operation of the magnetic recording apparatus in the normal-play mode has tracks between which guard bands extend.

As shown in FIG. 3, the audio tracks have portions 15 and 16 which fail to be overwritten with the video signal. As understood from the previous description, an outermost portion of the tape magnetic layer in each of these areas 15 and 16 is subjected to the erasing process so that the audio signal is erased from the outermost portions of these areas 15 and 16. Accordingly, even in cases where a tracking error occurs between a reproducing video head and a corresponding video track so that the reproducing video head scans a major part of the video track and also the portion 15 or 16 of the audio track, a reproduced video signal is protected from a crosstalk with the audio signal.

Figure 8:
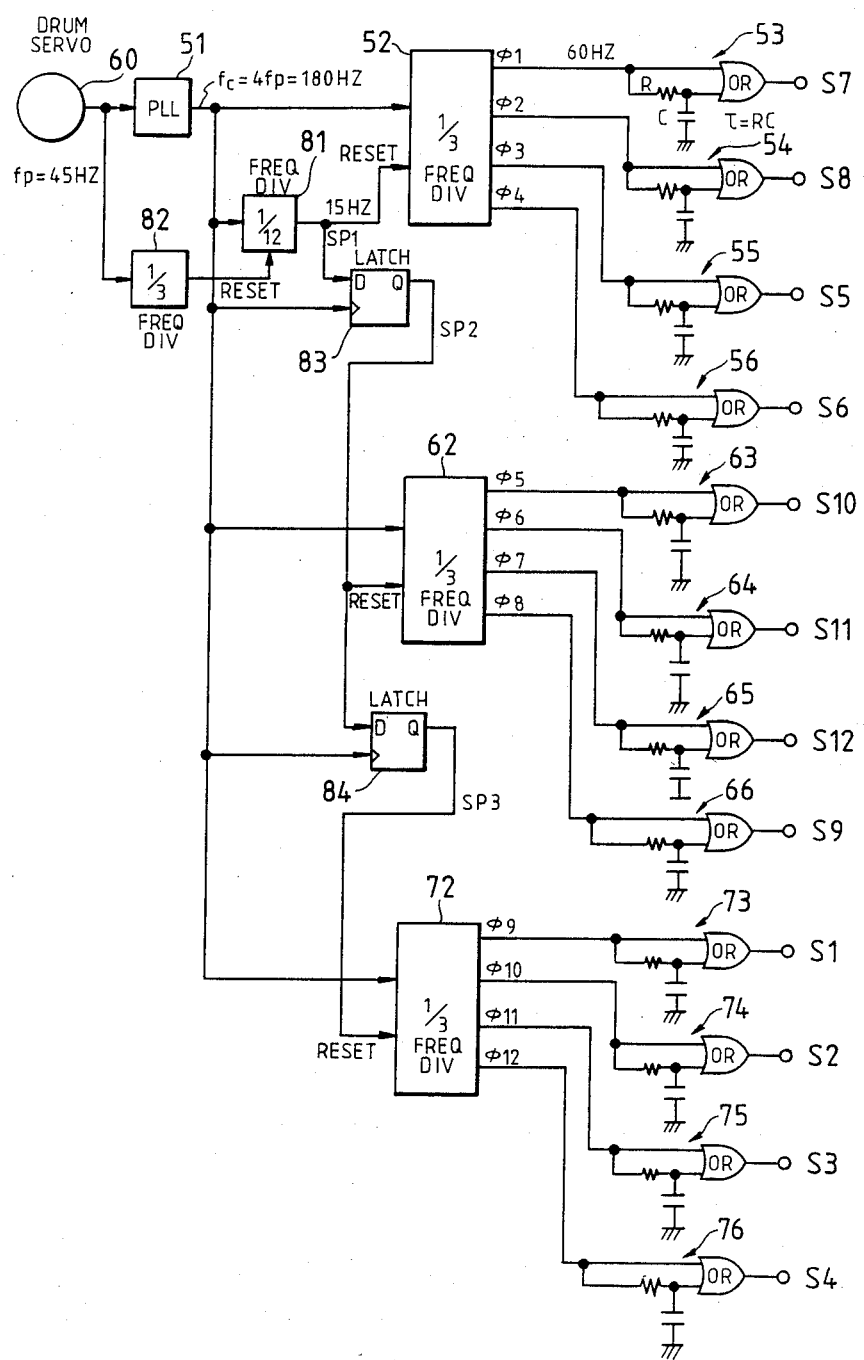
FIG. 8 is a block diagram of the change circuit of FIG. 5.
Figure 9:
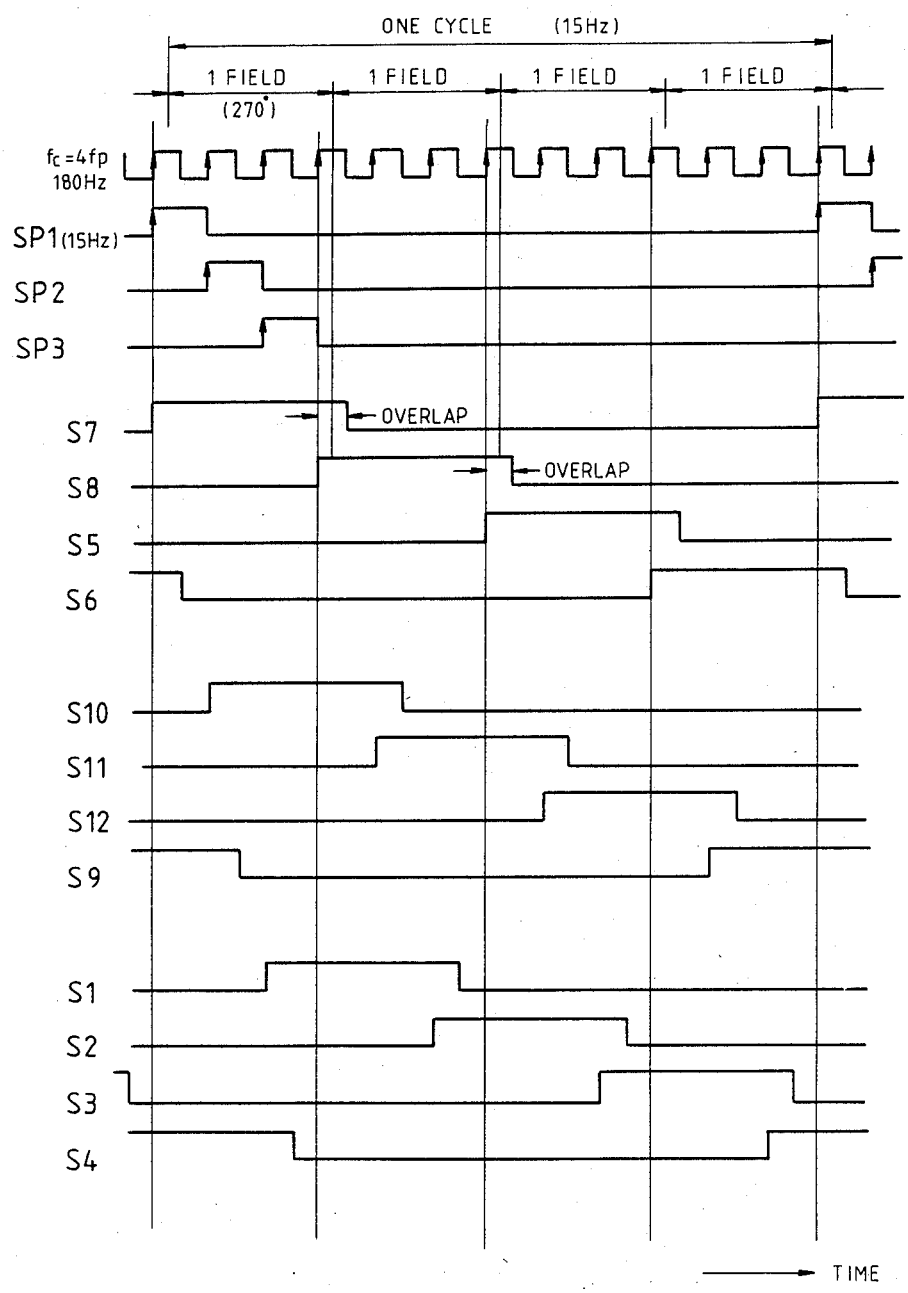
FIG. 9 is a timing diagram of various signals generated in the change circuit of FIG. 8.

The change circuit 50 for the NTSC system will be described in detail with reference to FIGS. 8 and 9. As shown in FIG. 8, the change circuit 50 includes a PLL circuit 51 deriving a pulse signal fc (see FIG. 9) from a signal fp generated in a servo control circuit 60 for the rotary drum 10. The frequency of the signal fp is 45 Hz. The frequency of the signal fc is 180 Hz.

A frequency divider 52 derives 60-Hz pulse signals $\phi1$, $\phi2$, $\phi3$, $\phi4$ from the 180-Hz signal fc. These pulse signals $\phi1$, $\phi2$, $\phi3$, $\phi4$ have equally-spaced phases. Monostable multivibrators 53, 54, 55, and 56, each composed of a combination of a CR integrator and an OR gate, derive the control signals S7, S8, S5, and S6 (see FIG. 9) from the pulse signals $\phi1$, $\phi2$, $\phi3$, $\phi4$ respectively. Each of the monostable multivibrators 53-56 retards the trailing edge of a pulse by a given time corresponding to an overlap period.

A frequency divider 62 derives 60-Hz pulse signals $\phi 5$, $\phi 6$, $\phi 7$, $\phi 8$ from the 180-Hz signal fc. These pulse signals $\phi 5$, $\phi 6$, $\phi 7$, $\phi 8$ have equally-spaced phases. Monostable multivibrators 63, 64, 65, and 66, each composed of a combination of a CR integrator and an OR gate, derive the control signals S10, S11, S12, and S9 (see FIG. 9) from the pulse signals $\phi 5$, $\phi 6$, $\phi 7$, $\phi 8$ respectively. Each of the monostable multivibrators 63–66 retards the trailing edge of a pulse by a given time corresponding to an overlap period.

A frequency divider 72 derives 60-Hz pulse signals $\phi 9$, $\phi 10$, $\phi 11$, $\phi 12$ from the 180-Hz signal fc. These pulse signals $\phi 9$, $\phi 10$, $\phi 11$, $\phi 12$ have equally-spaced phases. Monostable multivibrators 73, 74, 75, and 76, each composed of a combination of a CR integrator and an OR gate, derive the control signals S1, S2, S3, and S4 (see FIG. 9) from the pulse signals $\phi 9$, $\phi 10$, $\phi 11$, $\phi 12$ respectively. Each of the monostable multivibrators 73–76 retards the trailing edge of a pulse by a given time corresponding to an overlap period.

The frequency dividers 52, 62, and 72 are reset by pulse signals SP1, SP2, and SP3 (see FIG. 9) respectively. The reset signals SP1, SP2, and SP3 have a frequency of 15 Hz but different phases so that a group of the output signals from the frequency divider 52, a group of the output signals from the frequency divider 62, and a group of the output signals from the frequency dividers 72 are in different phases respectively. Accordingly, there are differences in phase between a group of the control signals S1-S4, a group of the control signals S5-S8, and a group of the signals S9-S12 as shown in FIG. 9.

Specifically, the 15-Hz reset signal SP1 is derived from the 180-Hz signal fc by a frequency divider 81. The frequency divider 81 is reset by a 15-Hz signal which is derived from the 45-Hz signal fp by a frequency divider 82. The second reset signal SP2 is generated on the basis of the first reset signal SP1 by a latch 83 supplied with the signal fc. The third reset signal SP3 is generated on the basis of the second reset signal SP2 by a latch 84 supplied with the signal fc.

DESCRIPTION OF THE SECOND PREFERRED EMBODIMENT

A second embodiment of this invention is similar to the embodiment of FIGS. 1–9 except for design changes described hereinafter.

In the second embodiment, the height difference "h" between the position of the audio heads and the position of the video heads is set to 72 micrometers. In addition, the formation of audio tracks precedes the formation of video tracks by a period corresponding to four times one third of a field period.

At first, the audio head A1 forms an audio track where the audio signal is recorded even in a deep portion of the tape magnetic layer. When a time corresponding to one third of a field period elapses since the initiation of the recording via the audio head A1, the audio head A4 starts to erase the audio signal from a portion of an outermost region of the tape magnetic layer in the audio track. At a moment ⅔ field period thereafter, that is, at a moment preceding the initiation of the recording process via the video head V1 by a period corresponding to one third of a field period, the video head V2 starts to erase the audio signal from another portion of the outermost region of the tape magnetic layer in the audio track. Finally, at a moment ⅓ field period thereafter, the video head V1 starts to form a video track and thus to write the video signal on an outermost region of the tape magnetic layer in the audio track.

DESCRIPTION OF THE THIRD PREFERRED EMBODIMENT

A third embodiment of this invention is similar to the embodiment of FIGS. 1–9 except for design changes described hereinafter.

Figure 10:
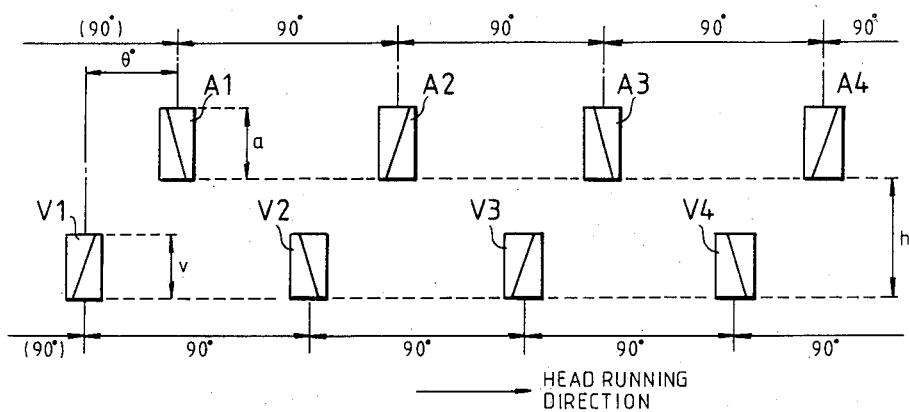
FIG. 10 is a developed side view of a rotary drum with magnetic heads in a magnetic recording apparatus according to a third embodiment of this invention.
Figure 11:
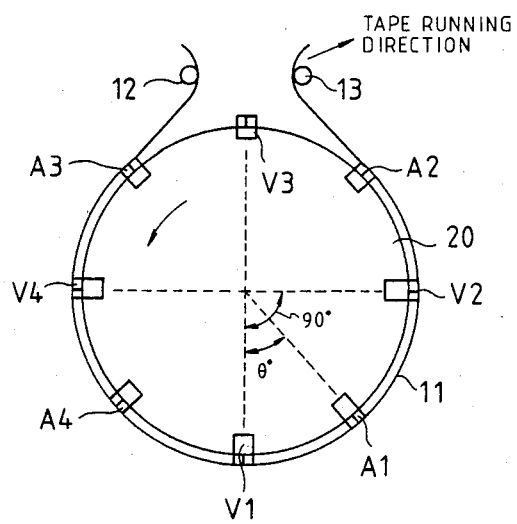
FIG. 11 is a top view of the rotary drum and the magnetic heads of FIG. 10.

In the third embodiment, as shown in FIGS. 10 and 11, the audio heads A1–A4 are angularly distant from the associated video heads V1–V4 by equal angles $\theta°$ of, for example, 45°.

The height difference "h" between the position of the video heads V1–V4 and the position of the audio heads A1–A4 is set close to the sum of first and second values, the first value being equal to a given integer times one third of the track pitch in the normal-play mode, the second value corresponding to the angle $\theta°$ divided by 270° In addition, the height difference "h" is set to close to the sum of third and fourth values, the third value being equal to a given integer times one third of the track pitch in the long-play mode, the fourth value corresponding to the angle $\theta°$ divided by 270°.

Figure 12:
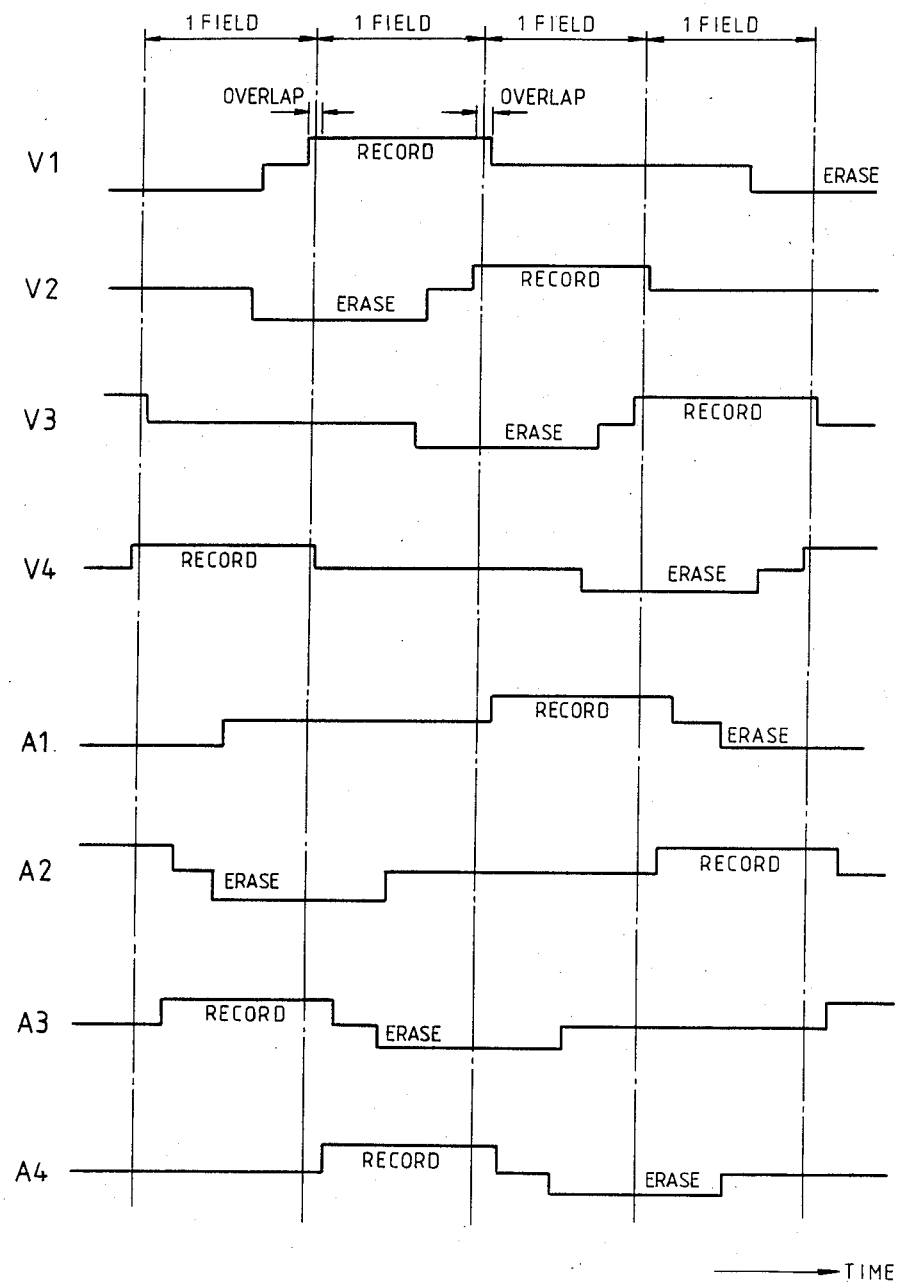
FIG. 12 is a timing diagram of operations of the magnetic heads of FIGS. 10 and 11.

As understood from FIG. 12, during the operation of the magnetic recording apparatus in the normal-play mode, at a moment ⅓ field period prior to the formation of a video track in a tape area approximately equal to a tape area previously formed with an audio track, the video head starts to erase the audio signal from an outermost portion of the tape magnetic layer in the audio track. The erasing process via the audio head precedes the initiation of the formation of a video track by a period equal to $(\theta/270)+(n/3)$ times a field period, where the letter "n" denotes zero or a given positive integer. The initiation of this erasing process follows the initiation of the formation of an audio track by a period corresponding to one third of a field period.

It should be noted that this invention is not limited to the previously-mentioned embodiments. This invention may be also applied to apparatuses in which guard bands are formed during operation in a long-play mode (for example, a color video signal recording apparatus of the SECAM type).

What is claimed is:
1. A magnetic recording apparatus comprising:
 (a) a rotary drum around which a magnetic tape extends in an angular range substantially equal to 270° C.; and
 (b) four pairs of magnetic rotary heads mounted on the rotary drum, wherein the rotary heads in each of the pairs have a common azimuth angle, wherein two of the pairs of the rotary heads are angularly spaced substantially at right angles and have track widths greater than a track pitch in a long-play mode and constitute video heads used in both the long-play mode and a normal-play mode, wherein the other two pairs of the rotary heads are angularly spaced substantially at right angles and constitute audio heads, wherein the video heads alternate with the audio heads in a direction of rotation of the rotary drum;
 wherein during a recording mode where guard bands are provided between video signal recording tracks formed via the video heads, a group of audio signal recording tracks and a group of video signal re- cording tracks are formed in a deep portion and an outermost portion of a magnetic layer of the magnetic tape respectively by repeating processes as follows: one of the audio heads forms an audio signal recording track in the magnetic tape, then the subsequent audio head and video head erase a previously-recorded signal from an outermost portion of the tape magnetic layer in the audio signal recording track and from both sides of the audio signal recording track, and one of the video heads forms a video signal recording track; and one of the video heads forms a video signal recording track in an outermost portion of the tape magnetic layer in an area substantially to a location of the audio signal recording track where recorded signal was erased from the outermost portion of the tape magnetic layer and the sides of the recording track.

2. A magnetic recording apparatus comprising:
(a) a rotary drum around which a magnetic tape extends in an angular range substantially equal to 270° C.; and
(b) four pairs of magnetic rotary heads mounted on the rotary drum, wherein the rotary heads in each of the pairs have a common azimuth angle, wherein two of the pairs of the rotary heads are angularly spaced substantially at right angles and have track widths greater than a track pitch in a long-play mode and constitute video heads used in both the long-play mode and a normal-play mode, wherein the other two pairs of the rotary heads are angularly spaced substantially at right angles and constitute audio heads, wherein the video heads alternate with the audio heads in a direction of rotation of the rotary drum;
wherein during a recording mode where guard bands are provided between video signal recording tracks formed via the video heads, a group of audio signal recording tracks and a group of video signal recording tracks are formed in a deep portion and an outermost portion of a magnetic layer of the magnetic tape respectively by repeating processes as follows: one of the audio heads forms an audio signal recording track in the magnetic tape, then the subsequent audio head and video head erase a previously-recorded signal from an outer most portion of the tape magnetic layer in the audio signal recording track, and one of the video heads forms a video signal recording track in an outermost portion of the tape magnetic layer in an area substantially to a location of the audio signal recording track where recorded signal was erased from the outermost portion of the tape magnetic layer,
and further wherein the video heads and the audio heads constitute four sets of double azimuth heads; each of the sets is composed of the video head and the audio head having different azimuth angles and being close to each other; the four sets are spaced at equal angular intervals of 90° C.; when a time corresponding to one third of a field period elapses since an initiation of a formation of an audio signal recording track by one of the audio heads, the subsequent audio head starts to erase a recorded signal from an outermost portion of the tape magnetic layer in the audio signal recording track; n/3 field period thereafter, the video head starts to erase the recorded signal from an outermost portion of the tape magnetic layer in the audio signal recording track, the character n denoting zero or a positive integer; and ⅓ field period thereafter, the subsequent video head starts to form a video signal recording track in an outermost portion of the tape magnetic layer in an area substantially equal to a location of the audio signal recording track.

3. A magnetic recording apparatus comprising:
(a) a rotary drum around which a magnetic tape extends in an angular range substantially equal to 270° C.; and
(b) four paris of magnetic rotary heads mounted on the rotary drum, wherein the rotary heads in each of the pairs have a common azimuth angle, wherein two of the pairs of the rotary heads are angularly spaced substantially at right angles and have track widths greater than a track pitch in a long-play mode constitute video heads used in both the long-play mode and normal-play mode, wherein the other two pairs of the rotary heads are angularly spaced substantially at right angles and constitute audio heads, wherein the video heads alternate with the audio heads in a direction of rotation of the rotary drum;
wherein during a recording mode where guard bands are provided between video signal recording tracks formed via the video heads, a group of audio signal recording tracks and a group of video signal recording tracks are formed in a deep portion and an outermost portion of a magnetic layer of the magnetic tape respectively by repeating processes as follows: one of the audio heads forms an audio signal recording track in the magnetic tape, then the subsequent audio head and video head erase a previously-recorded signal from an outermost portion of the tape magnetic layer in the audio signal recording track, and one of the video heads forms a video signal recording track in an outermost portion of the tape magnetic layer in an area substantially equal to a location of the audio signal recording track where the recorded signal was erased from the outermost portion of the tape magnetic layer,
and further wherein positions of the audio heads are in advance of positions of the video heads in a direction of rotation of the rotary drum by a given angle $\theta$; the video head starts to erase a recorded signal from an outermost portion of the tape magnetic layer in an audio signal recording track at a moment 166 field period before an initiation of a formation of a video signal recording track in an area substantially equal to a location of the audio signal recording track; the other audio head starts to erase a recorded signal from an outermost portion of the tape magnetic layer in the audio signal recording track a moment a given period before an initation of a formation of video signal recording track via the other video head, the given period being equal to $(\theta/270)+(n/3)$ times a field period, the character n denoting zero or a positive integer; and ⅓ field period before the other audio head starts to erase a recorded signal from an outer most portion of the tape magnetic layer in the audio signal recording track, the audio head starts to form an audio signal recording track.

4. A magnetic recording apparatus comprising:
(a) a rotary drum around which a magnetic tape extends in an angular range substantially equal to 270° C.;

(b) four pairs of magnetic rotary heads mounted on the rotary drum, wherein the rotary heads in each of the pairs have a common azimuth angle, wherein two of the pairs of the rotary heads are angularly spaced substantially at right angles and have track widths greater than a track pitch in a long-play mode and constitute video heads used in both the long-play mode and a normal-play mode, wherein the other two pairs of the rotary heads are angularly spaced substantially at right angles and constitute audio heads, wherein the video heads alternate with the audio heads in a direction of rotation of the rotary drum; and (c) means for activating one of the audio heads to form an audio signal recording track in the magnetic tape, means for activating the subsequent audio head and video head to erase a previously-recorded signal from an outermost portion of the tape magnetic layer in the audio signal recording track; and means for activating one of the video heads to form a video signal recording track in an outermost portion of the magnetic layer in an area substantially equal to a location the audio signal recording tack where the recorded signal was erased from the outermost portion of the tape magnetic layer, wherein during a recording mode where guard bands are provided between video signal recording tracks formed via the video heads, a group of audio signal recording tracks and a group of video signal recording tracks are formed in a deep portion and an outermost portion of a magnetic layer of the magnetic tape, respectively.

* * * * *